US011805761B2

(12) United States Patent
Bouchard

(10) Patent No.: US 11,805,761 B2
(45) Date of Patent: Nov. 7, 2023

(54) PORTABLE PET MEAL ASSEMBLY

(71) Applicant: James Bouchard, San Antonio, TX (US)

(72) Inventor: James Bouchard, San Antonio, TX (US)

( * ) Notice: Subject to any disclaimer, the term of this patent is extended or adjusted under 35 U.S.C. 154(b) by 148 days.

(21) Appl. No.: 17/381,345

(22) Filed: Jul. 21, 2021

(65) Prior Publication Data
US 2023/0024589 A1 Jan. 26, 2023

(51) Int. Cl.
*A01K 5/01* (2006.01)
*A01K 15/02* (2006.01)
*B65D 81/32* (2006.01)
*A01K 7/00* (2006.01)

(52) U.S. Cl.
CPC .............. *A01K 5/0121* (2013.01); *A01K 7/00* (2013.01); *A01K 15/026* (2013.01); *B65D 81/3205* (2013.01)

(58) Field of Classification Search
CPC .. A01K 5/0121; A01K 5/0128; A01K 15/026; B65D 81/3205
See application file for complete search history.

(56) References Cited

U.S. PATENT DOCUMENTS

| | | | | | |
|---|---|---|---|---|---|
| 3,608,770 | A | * | 9/1971 | Naimoli | A47J 39/006 220/592.2 |
| 3,924,009 | A | * | 12/1975 | Goldberg | B65D 85/72 426/138 |
| 4,013,798 | A | * | 3/1977 | Goltsos | B65D 81/3453 426/118 |
| 4,966,296 | A | * | 10/1990 | Farrell | B65D 21/0206 206/820 |
| 5,091,199 | A | * | 2/1992 | Maliy | B65D 71/72 53/433 |
| 5,839,574 | A | * | 11/1998 | Lorence | B65D 77/0433 426/112 |
| 5,919,501 | A | * | 7/1999 | Rozzano | B65D 21/0233 426/123 |
| D655,204 | S | * | 3/2012 | Meyers | D9/761 |
| 8,367,130 | B1 | * | 2/2013 | Tsengas | A23K 20/158 426/138 |
| D718,981 | S | | 12/2014 | Katterheinrich | |
| 10,973,206 | B2 | * | 4/2021 | Friedgood | A01K 7/005 |
| 11,046,475 | B2 | * | 6/2021 | Vandewall | B65D 5/6647 |
| 11,564,375 | B2 | * | 1/2023 | Jansen | B65D 85/72 |
| 2001/0048955 | A1 | | 12/2001 | Foreman | |

(Continued)

FOREIGN PATENT DOCUMENTS

WO    WO9726194    7/1997

*Primary Examiner* — Ebony E Evans

(57) ABSTRACT

A portable pet meal assembly includes a plurality of containers that is each attached together. A chew toy is positioned in a respective one of the containers and a fluid is contained in a respective one of the containers for the pet to drink. A granular food item is contained in a respective one of the containers for the pet to eat. A plurality of pet treats is contained in a respective one of the containers for the pet to eat. A plurality of covers is each removably attached to a respective one of the containers for closing the respective container. A box is provided and the plurality of containers is stored in the box to facilitate the plurality of containers to be purchased at a restaurant drive through window.

1 Claim, 6 Drawing Sheets

(56) References Cited

U.S. PATENT DOCUMENTS

| | | | |
|---|---|---|---|
| 2002/0185390 A1* | 12/2002 | Giguere | B65D 85/62 |
| | | | 119/168 |
| 2003/0026875 A1 | 2/2003 | Aguilar | |
| 2003/0026876 A1* | 2/2003 | Albuja | A01K 5/0114 |
| | | | 426/120 |
| 2003/0163936 A1* | 9/2003 | Floss | B42D 5/04 |
| | | | 40/107 |
| 2003/0178339 A1 | 9/2003 | De Marco | |
| 2004/0089583 A1* | 5/2004 | Coleman | B65D 25/24 |
| | | | 206/561 |
| 2005/0269218 A1* | 12/2005 | Sunvoid | A01K 5/0114 |
| | | | 206/219 |
| 2006/0144340 A1* | 7/2006 | Burge | A01K 5/0121 |
| | | | 119/61.5 |
| 2007/0264395 A1 | 11/2007 | Adams | |
| 2009/0035419 A1 | 2/2009 | Woods | |
| 2011/0318457 A1* | 12/2011 | Daniel | B65D 81/3294 |
| | | | 426/115 |

* cited by examiner

PORTABLE PET MEAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet meal devices and more particularly pertains to a new pet meal device that can be purchased at a vehicle drive through to feed a pet that is riding in a vehicle. The device includes a chew toy, a granular food item that resembles ice cream dots that the pet can eat, pet treats that the pet can eat and a fluid that the pet can drink. Each of the chew toy, the granular food item, the pet treats and the fluid are contained in respective containers that are attached together.

(2) Description of Related Art Including Information Disclosed Under 37 CFR 1.97 and 1.98

The prior art relates to pet meal devices including a variety of pet snack devices that includes a container with a plurality of compartments, each containing a pet food item, and a cover that is removably attached to the container. The prior art discloses a food tray for packaging a plurality of individual servings of food. The prior art discloses a fast food product that includes at least one animal food product along with a human food product. The prior art discloses a pet meal container that includes a plurality of pre-packaged pet food items.

BRIEF SUMMARY OF THE INVENTION

An embodiment of the disclosure meets the needs presented above by generally comprising a plurality of containers that is each attached together. A chew toy is positioned in a respective one of the containers and a fluid is contained in a respective one of the containers for the pet to drink. A granular food item is contained in a respective one of the containers for the pet to eat. A plurality of pet treats is contained in a respective one of the containers for the pet to eat. A plurality of covers is each removably attached to a respective one of the containers for closing the respective container. A box is provided and the plurality of containers is stored in the box to facilitate the plurality of containers to be purchased at a restaurant drive through window.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
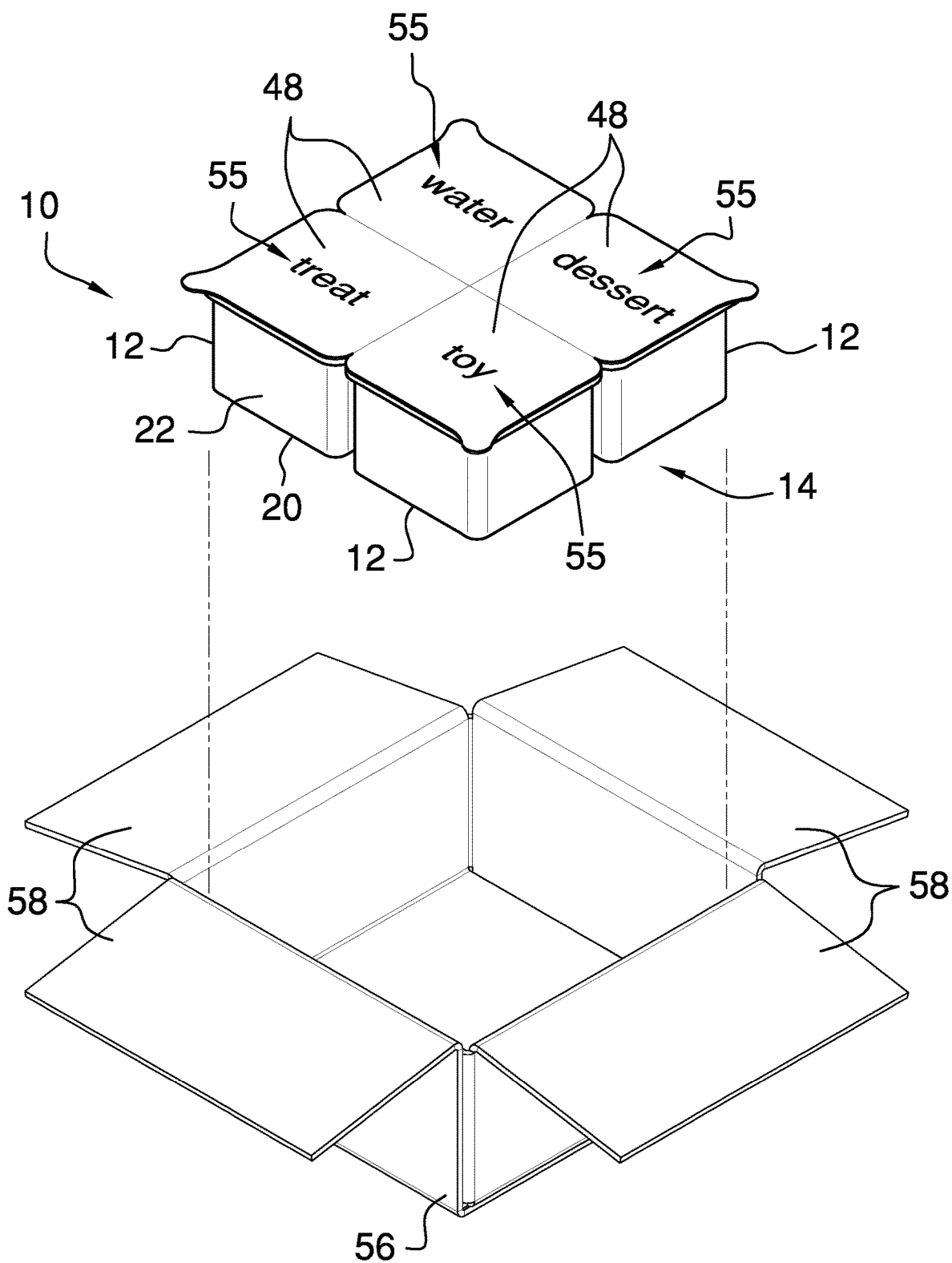
FIG. 1 is an exploded perspective view of a portable pet meal assembly according to an embodiment of the disclosure.
Figure 2:
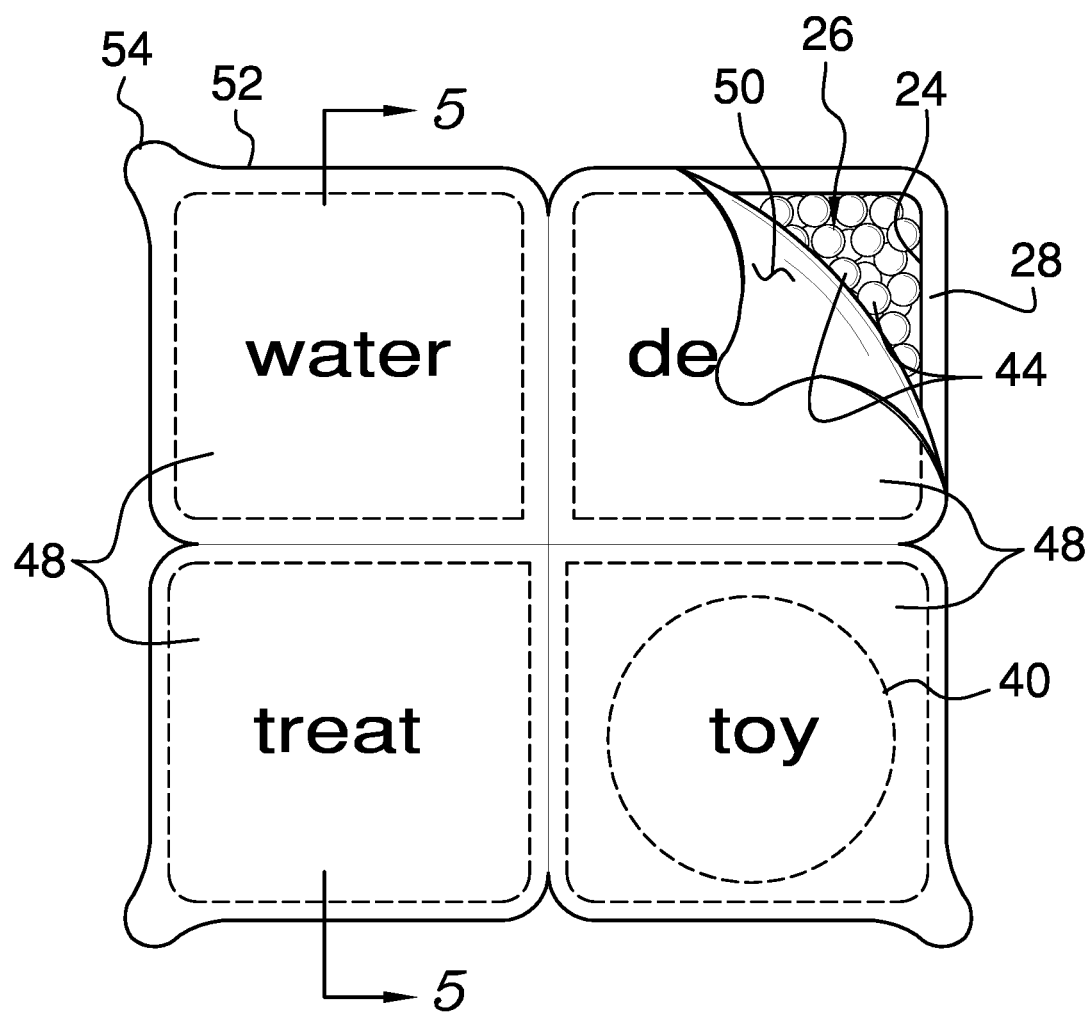
FIG. 2 is a top view of an embodiment of the disclosure.
Figure 3:
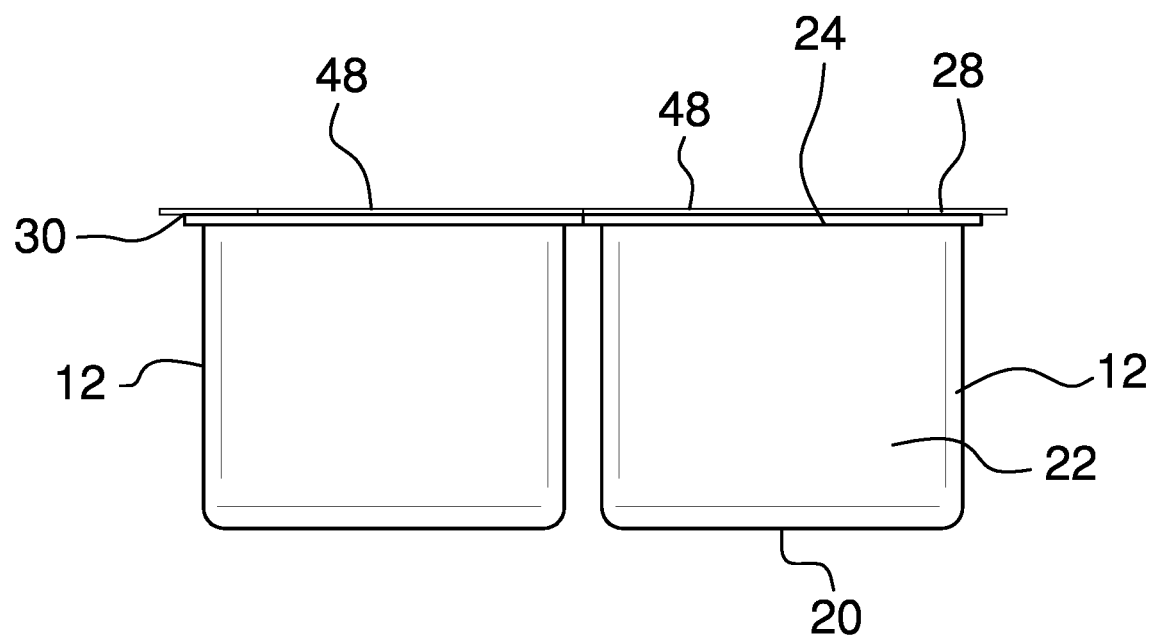
FIG. 3 is a front view of an embodiment of the disclosure.
Figure 4:
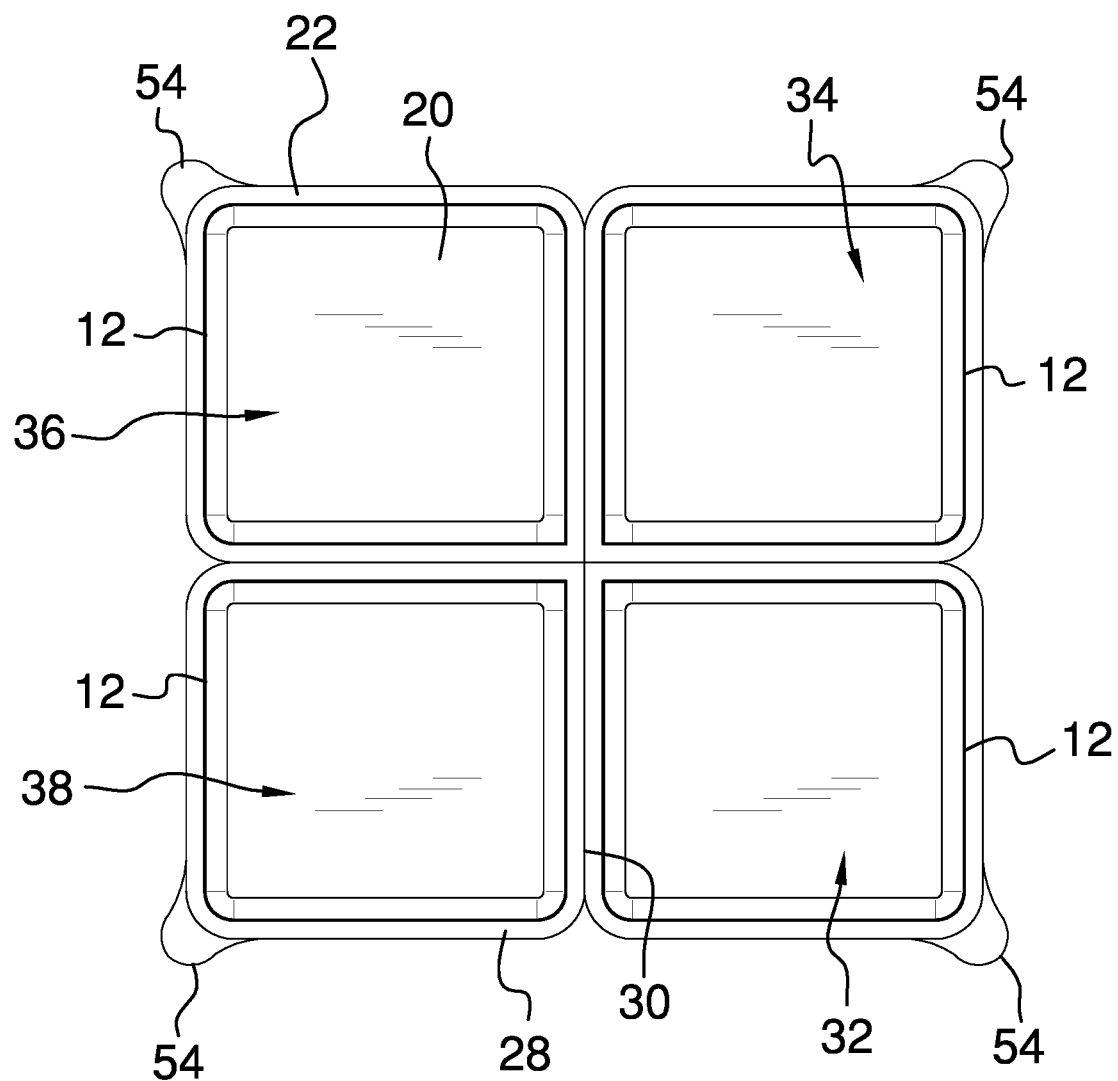
FIG. 4 is a bottom view of an embodiment of the disclosure.
Figure 5:
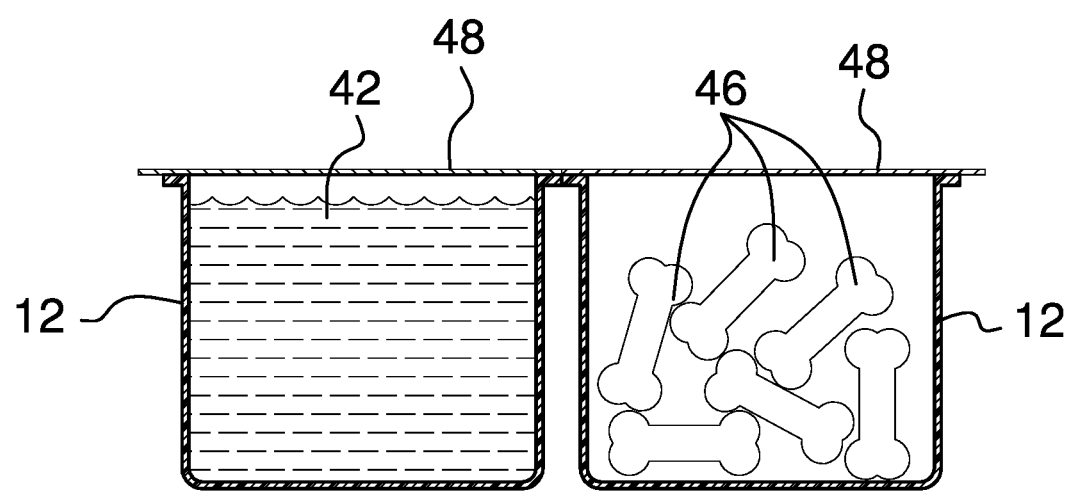
FIG. 5 is a cross sectional view take along line 5-5 of FIG. 2 of an embodiment of the disclosure.
Figure 6:
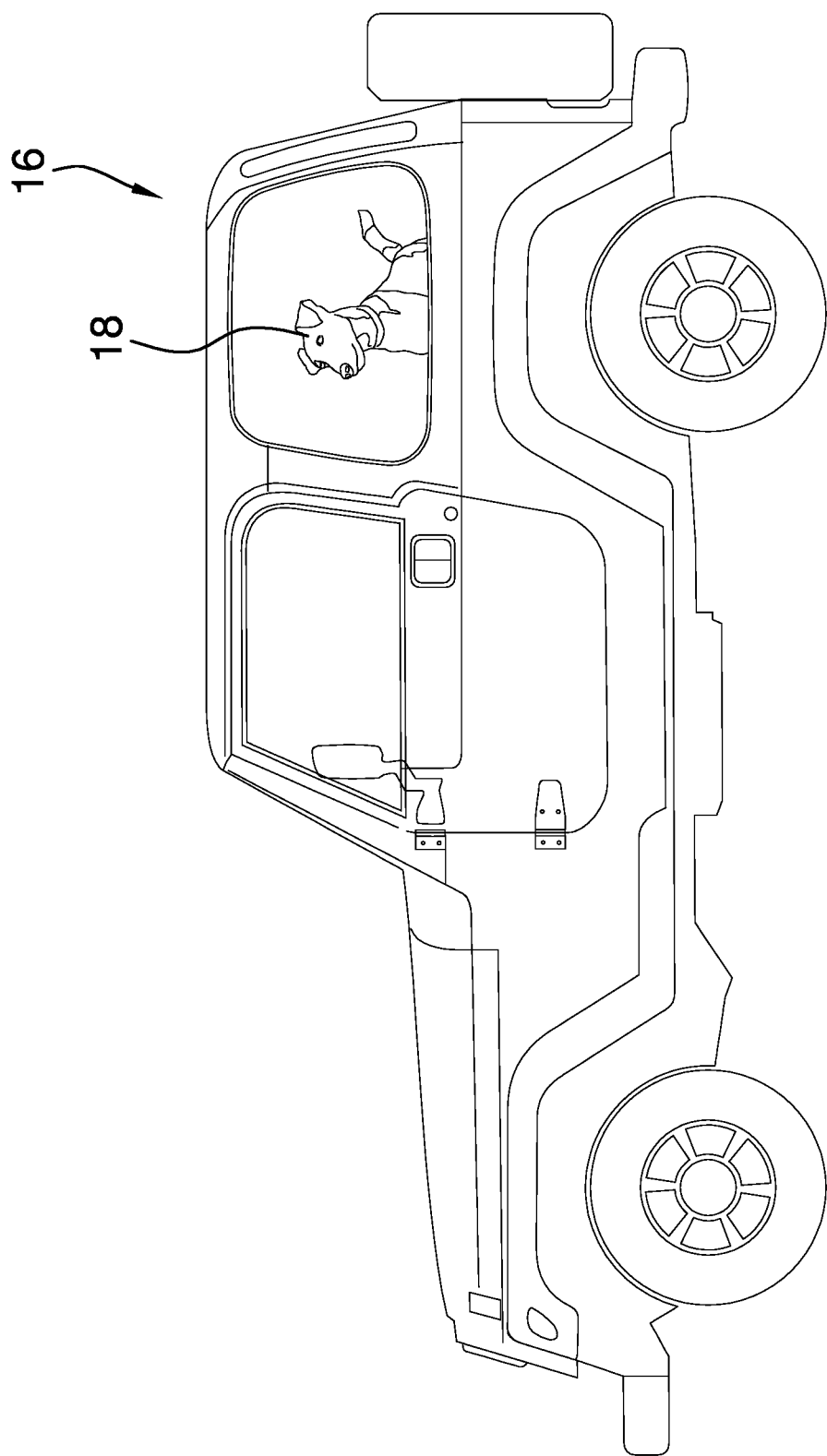
FIG. 6 is a perspective in-use view of an embodiment of the disclosure.

With reference now to the drawings, and in particular to FIGS. 1 through 6 thereof, a new pet meal device embodying the principles and concepts of an embodiment of the disclosure and generally designated by the reference numeral 10 will be described.

As best illustrated in FIGS. 1 through 6, the portable pet meal assembly 10 generally comprises a plurality of containers 12 that is each attached together such that the plurality of containers 12 defines a feeding tray 14. The feeding tray 14 can be positioned in a vehicle 16 in which a pet 18 is riding. Each of the containers 12 has a bottom wall 20 and an outer wall 22 extending upwardly from the bottom wall 20, and the outer wall 22 has a top edge 24 defining an opening 26 into a respective container 12. The outer wall 22 has a lip 28 extending outwardly from the outer wall 22, the lip 28 is aligned with the top edge 24 and the lip 28 extends around the opening 26. An outward edge 30 of the lip 28 associated with each of the containers 12 abuts the outward edge 30 of the lip 28 associated with an adjacent one of the containers 12. The plurality of containers 12 includes a treat container 32, a water container 34, a dessert container 36 and a toy container 38.

A chew toy 40 is provided and the chew toy 40 is positioned in a respective one of the containers 12. In this way the chew toy 40 is available to be chewed on by the pet 18 while the pet 18 is riding in a vehicle 16. The chew toy 40 is positioned in the toy container 38 and the chew toy 40 may comprise raw hide, a synthetic chew or any other kind of chew toy 40 that is approved for domesticated pets. A fluid 42 is contained in a respective one of the containers 12 such that the fluid 42 can be drank by the pet 18. The fluid 42 comprises water and the water is contained in the water container 34.

A granular food item 44 is provided and the granular food item 44 comprises a plurality of spheres. In this way the granular food item 44 has the appearance of ice cream dots. The granular food item 44 is contained in a respective one of the containers 12. Moreover, the granular food item 44 comprises animal food such that the granular food item 44 can be eaten by the pet 18, and the granular food item 44 is contained in the dessert container 36. A plurality of pet treats 46 is provided and each of the pet treats 46 is contained in a respective one of the containers 12. Each of the pet treats 46 comprises animal food such that each of the pet treats 46 can be eaten by the pet 18, and each of the pet treats 46 is positioned in the treat container 32. The pet 18 may be a domesticated dog, cat or other pet, and the animal food may be dog food, cat food or other type of pet food.

A plurality of covers 48 is provided and each of the covers 48 is removably attached to a respective one of the containers 12 for closing the respective container 12. Each of the covers 48 has a bottom surface 50 and a perimeter edge 52, and the bottom surface 50 of each of the covers 48 is removably bonded to the lip 28 extending around the top edge 24 of the respective container 12. Additionally, each of the covers 48 completely covers 48 the opening 26 in the respective container 12. The perimeter edge 52 of each of the containers 12 is aligned with the outward edge 30 of the lip 28 associated with the respective container 12.

Each of the covers 48 has a lobe 54 extending outwardly from the perimeter edge 52 such that the lobe 54 extends outwardly beyond the outward edge 30 of the lip 28 associated with the respective container 12. In this way the lobe 54 can be gripped for removing the covers 48 from the container 12. The covers 48 are arranged such that the lobe 54 on each of the covers 48 is aligned with a respective one of four corners of the feeding tray 14 defined by the plurality of containers 12. Each of the covers 48 may be comprised of a deformable material such as paper, plastic or other similar material. As is most clearly shown in FIGS. 1 and 2, indicia 55 may be printed on each of the covers 48 and the indicia 55 may comprise the words "water", "dessert", "treat", and "toy" for identifying the contents of the respective container 12.

A box 56 is included and the plurality of containers 12 can be stored in the box 56. In this way the box 56 facilitates the plurality of containers 12 to be purchased at a restaurant drive through window or other location that would serve customers that are driving in their vehicle 16. A plurality of flaps 58 is each movably integrated into the box 56. The flaps 58 are positionable in a closed position for closing the box 56 and retaining the containers 12 in the box 56.

In use, the box 56 might be purchased a vehicle 16 drive through of a fast food restaurant when the user wishes to feed their pet 18 in their vehicle 16. The covers 48 can be removed from one or all of the containers 12, depending on the user's wishes for feeding their pet 18. In this way the user's pet 18 can eat and drink while the user and the pet 18 are traveling in the user's vehicle 16. Additionally, the chew toy 40 facilitates the pet 18 to be entertained while the pet 18 is traveling in the vehicle 16. The containers 12 can be broken apart from each other or the containers 12 can be left attached together, depending on the user's preference. Each of the containers 12 and the covers 48 are discarded when the pet 18 is finished eating and drinking.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A method of feeding a pet while traveling in a vehicle, the steps of the method comprising:
   providing a plurality of containers, each of said containers being coupled together to form a feeding tray;
   providing a chew toy for a pet, said chew toy comprising a synthetic chew toy;
   providing a fluid being drinkable by the pet;
   providing granular food item being eatable by the pet;
   providing a plurality of pet treats each being eatable by the pet;
   providing a plurality of covers;
   providing a box;
   positioning said chew toy in a respective one of said containers;
   positioning said fluid in a respective one of said containers;
   positioning said granular food item in a respective one of said containers;
   positioning each of said pet treats in a respective one of said containers;
   attaching each of said covers to a respective one of said plurality of covers to a respective one of said containers for closing said respective container;
   positioning each of said containers in said box;
   delivering said box to a customer with a pet;
   removing said containers from said box;
   separating said containers from each other;
   removing said cover from a respective of said containers based on a preference of a user; and
   allowing the pet to consume the contents of said respective container.

* * * * *